Patented Sept. 11, 1934

1,973,574

UNITED STATES PATENT OFFICE 1,973,574

PROCESS FOR MANUFACTURING AND RECOVERING GLUTAMIC ACID

Albert E. Marshall, New York, N. Y., assignor to The Larrowe-Suzuki Company, Rossford, Ohio, a corporation of Ohio No Drawing. Original application April 29, 1931, Serial No. 533,790. Divided and this application May 27, 1932, Serial No. 614,048

6 Claims. (Cl. 260—119)

This invention relates generally to novel processes of manufacturing and recovering d-glutamic acid from readily available raw materials and in a relatively high state of purity.

A general object of the invention is to provide novel processes of manufacturing d-glutamic acid from glutamic mother substances by a simple treatment, and in a convenient, efficient and economical manner.

Further and more particular objects of the invention are to provide novel and efficient methods of recovering the d-glutamic acid in a relatively high state of purity from either alkaline or acid hydrolysis liquors.

Other objects of the invention will in part be obvious and will in part appear hereinafter.

The invention accordingly comprises the several steps and the relation of one or more of such steps with respect to each of the others which are exemplified in the following detailed disclosure, and the scope of the application of which will be indicated in the claims.

The present process contemplates the utilization of any suitable raw material from which glutamic acid may be prepared by hydrolysis. This class of raw materials will be referred to herein as "glutamic mother substances", and includes materials from which glutamic acid may be formed, such as vegetable proteins, wheat gluten, animal proteins, casein, and the like as well as the more impure materials, such as beet molasses, molasses residues such as distillery slops, and desaccharified beet molasses, for example, Steffen's waste water.

The hydrolysis of glutamic mother substances may be carried out in any suitable manner under either acid or alkaline conditions. After the hydrolysis is sufficiently complete, the mixture is acidified if necessary, preferably with hydrochloric acid, until the pH is about 2.1, having previously been concentrated to a point just short of that at which the salt of the acid and glutamic acid, such as glutamic acid hydrochloride, will crystallize out.

If the glutamic mother substance is of a type containing interfering quantities of inorganic salts and unless these have been previously removed therefrom, they may be removed from the mixture at this stage in any suitable manner, as by cooling and centrifuging.

To the acidified hydrolysate is then added a concentrated alkali such as, for example, a strong sodium hydroxide solution, until the pH is 3.2, which is the isoelectric point of glutamic acid. This solution is then allowed to cool and to stand for several days, during which time the glutamic acid crystallizes out and is removed by filtration; the crystalline product containing about 90% d-glutamic acid.

It will thus be seen that by means of the present invention there has been provided a process by which d-glutamic acid can be conveniently, efficiently and economically produced from a variety of raw materials by a series of correlated and carefully controlled steps, and since certain changes in carrying out the above process may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language might be said to fall therebetween. Particularly it is to be understood that in said claims, ingredients or compounds recited in the singular are intended to include compatible mixtures of such ingredients wherever the sense permits.

This application is a continuation and is divided out of application Serial No. 533,790, filed April 29, 1931 jointly by me with Reisuke Masuda and Celestian L. Royal, now Patent No. 1,947,563, dated February 20, 1934.

Having described my invention, what I claim as new and desire to secure by Letters Patent, is:

1. In a process of manufacturing the d-glutamic acid from crude materials, the steps which comprise preparing a concentrated solution containing crude d-glutamic acid hydrochloride and having a pH of about 2.1, removing inorganic salts present in the crude material, and adding an alkali to the remaining liquid until a composition having a pH of about 3.2 is obtained.

2. In a process of manufacturing d-glutamic acid, the steps which comprise preparing a concentrated solution of a hydrolyzed crude glutamic substance, adding hydrochloric acid until the pH is about 2.1, cooling and removing inorganic salts, present in the crude glutamic substance, neutralizing the remaining liquid with a concentrated alkali until the pH is 3.2, allowing the solution to cool and stand until the d-glutamic acid crystallizes out, and then separating the crystals therefrom.

3. The method of forming glutamic acid, consisting in hydrolyzing a protein capable of yielding glutamic acid, and neutralizing the hydrolysate until the hydrogen ion concentration of the solution corresponds to the isoelectric point of glutamic acid, thereby separating the maximum quantity of said acid.

4. In a process of manufacturing the d-glutamic acid from crude materials, the steps which comprise preparing a solution of a salt of crude d-glutamic acid with an acid, said solution having a pH of about 2.1 and a concentration just short of that at which the said acid salt of d-glutamic acid will crystallize out, removing inorganic salts present in the crude material, and adding an alkali to the remaining liquid until a composition having a pH of about 3.2 is obtained.

5. In a process of manufacturing the d-glutamic acid from crude materials, the steps which comprise preparing a concentrated solution of a hydrolyzed crude glutamic substance, adding an acid thereto until the pH is about 2.1, cooling and removing inorganic salts present in the crude glutamic substance, neutralizing the remaining liquid with a concentrated alkali until the pH is 3.2, allowing the solution to cool and stand until the d-glutamic acid crystallizes out, and then separating the crystals therefrom, the concentration of the said concentrated solution being just short of that at which the salt of the added acid and glutamic acid will crystallize out.

6. The method of forming glutamic acid consisting in hydrolyzing a mother substance capable of yielding glutamic acid, and neutralizing the hydrolysate until the hydrogen ion concentration of the solution corresponds to the isoelectric point of glutamic acid, thereby separating the maximum quantity of said acid.

ALBERT E. MARSHALL.